(12) United States Patent
Kouda et al.

(10) Patent No.: US 8,629,929 B2
(45) Date of Patent: Jan. 14, 2014

(54) IMAGE PROCESSING APPARATUS AND IMAGE PROCESSING METHOD

(71) Applicant: Sony Corporation, Minato-ku (JP)

(72) Inventors: Michitomo Kouda, Tokyo (JP); Tatsunobu Koike, Kanagawa (JP); Yuu Sonoda, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/932,308

(22) Filed: Jul. 1, 2013

(65) Prior Publication Data

US 2013/0293757 A1 Nov. 7, 2013

Related U.S. Application Data

(63) Continuation of application No. 13/312,096, filed on Dec. 6, 2011.

(30) Foreign Application Priority Data

Dec. 13, 2010 (JP) ................................ 2010-276645

(51) Int. Cl.
   *H04N 5/222* (2006.01)
   *H04N 5/228* (2006.01)
   *H04N 5/76* (2006.01)

(52) U.S. Cl.
   USPC .............. 348/333.02; 348/222.1; 348/231.99; 348/231.6; 348/333.01; 348/333.04

(58) Field of Classification Search
   USPC .............................. 348/207.99–207.2, 222.1, 348/231.99–231.9, 333.01–333.13
   See application file for complete search history.

(56) References Cited

U.S. PATENT DOCUMENTS

| | | | |
|---|---|---|---|
| 8,023,816 B2 * | 9/2011 | Yukitake et al. | 396/287 |
| 2002/0030754 A1 * | 3/2002 | Sugimoto | 348/333.02 |
| 2002/0172516 A1 * | 11/2002 | Aoyama | 396/287 |
| 2004/0165070 A1 | 8/2004 | Yoshida et al. | |
| 2004/0257459 A1 | 12/2004 | Shim | |
| 2005/0195293 A1 | 9/2005 | Kobayashi et al. | |
| 2005/0237411 A1 | 10/2005 | Watanabe | |
| 2006/0072028 A1 * | 4/2006 | Hong | 348/333.01 |
| 2007/0030362 A1 | 2/2007 | Ota et al. | |
| 2007/0033626 A1 * | 2/2007 | Yang et al. | 725/105 |
| 2007/0188647 A1 | 8/2007 | Ikeda | |
| 2007/0200945 A1 | 8/2007 | Inukai | |
| 2007/0258005 A1 * | 11/2007 | Koike et al. | 348/333.11 |
| 2008/0297638 A1 | 12/2008 | Hiratsuka | |
| 2009/0027539 A1 | 1/2009 | Kunou | |
| 2009/0040329 A1 | 2/2009 | Uehara et al. | |

FOREIGN PATENT DOCUMENTS

JP 2006-323578 11/2006

* cited by examiner

*Primary Examiner* — Michael Osinski
(74) *Attorney, Agent, or Firm* — Oblon, Spivak, McClelland, Maier & Neustadt, L.L.P.

(57) ABSTRACT

An image processing apparatus includes an operation receiving unit; and a control unit configured to perform a normal mode display process of displaying icon images of kinds corresponding to an operation status of the apparatus in a display unit and an icon description display process of displaying an icon selection image for selecting an icon image that is being displayed in the display unit upon reception of an operation input to activate an icon description mode by the operation receiving unit during the normal mode display process in the display unit and displaying a description image for an icon image selected upon reception of an operation input by the operation receiving unit while the icon selection image is being displayed in the display unit.

9 Claims, 12 Drawing Sheets

FIG. 4

| 11 | 12 | 13 | 14 | 15 | 16 | 17 |
|---|---|---|---|---|---|---|
| DESCRIPTION ID | TITLE | FIRST DESCRIPTION | SECOND DESCRIPTION | THIRD DESCRIPTION | GUIDE CONTENT IMAGE | CORRESPONDING IMAGE OBJECT ID |
| 001 | CONFIRM REMAINING AMOUNT OF BATTERY | ICON INDICATING REMAINING AMOUNT OF BATTERY IS DISPLAYED ON UPPER LEFT PART OF LCD SCREEN. IT TAKES ABOUT ONE MINUTE TO CORRECTLY DISPLAY REMAINING AMOUNT OF BATTERY. | NULL | NULL | 001.jpg | idBattery_Full idBattery_2_3, idBattery_1_3, idBattery_Empty |
| 002 | DISPLAY LIST OF IMAGES | LISTING MAKES IMAGE SEARCH EASY IN PLAYBACK OF IMAGE. | 1. PRESS [INDEX] BUTTON IN PLAYBACK MODE 2. PRESS [INDEX] BUTTON AGAIN TO INCREASE THE NUMBER OF IMAGES IN LIST | • PRESSING [INDEX] BUTTON AGAIN CAUSES CALENDAR TO BE DISPLAYED DURING PLAYBACK IN [DATE VIEW]. | 002.jpg | NULL |
| 003 | CHANGE SIZE OF STILL IMAGE | IMAGE CAPTURING IN LARGER IMAGE SIZE INCREASES MEMORY SIZE TO DECREASE THE NUMBER OF IMAGES THAT CAN BE STORED. | 1. [MENU]–[IMAGE SIZE] IN STILL IMAGE PHOTOGRAPHING MODE 2. SELECT ANY OF IMAGE SIZES | NULL | 003.jpg | id_ImageSize_4_3_10M, id_ImageSize_4_3_5M, id_ImageSize_4_3_VGA |
| 004 | ABOUT INTEGRATED MEMORY | IMAGES ARE RECORDED IN INTEGRATED MEMORY WITHOUT MEMORY CARD. LOADING OF MEMORY CARD CAUSES IMAGES TO BE AUTOMATICALLY RECORDED IN MEMORY CARD. | NULL | • INTEGRATED MEMORY CANNOT BE REMOVED • IT IS RECOMMENDED TO COPY IMAGES STORED IN INTEGRATED MEMORY INTO MEMORY CARD BY [MEMORY CARD TOOL]–[COPY] | 004.jpg | idMedia_InMemory |
| ⋮ | ⋮ | ⋮ | ⋮ | ⋮ | ⋮ | ⋮ |
| ⋮ | ⋮ | ⋮ | ⋮ | ⋮ | ⋮ | ⋮ |

FIG. 6

| (DISPLAYED OBJECT NAME) | DISPLAY ID | IMAGE OBJECT NAME | X | Y | W | H |
|---|---|---|---|---|---|---|
| (IMAGE SIZE_4_3_16M) | 001 | id_ImageSize_4_3_10M | 268 | 30 | 44 | 36 |
| (BATTERY_FULL CHARGE) | 002 | idBattery_Full | 36 | 30 | 66 | 36 |
| (PHOTOGRAPHING MODE (CUSTOM AUTOMATIC PHOTOGRAPHING)) | 003 | idCamMode_iAuto | 40 | 70 | 80 | 56 |
| (INTEGRATED MEMORY) | 004 | idMedia_InMemory | 552 | 30 | 48 | 36 |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| (NO ICON) | 64 | NULL | NULL | NULL | NULL | NULL |

…

IMAGE PROCESSING APPARATUS AND IMAGE PROCESSING METHOD

CROSS-REFERENCE TO RELATED APPLICATIONS

This application is a continuation of application Ser. No. 13/312,096, filed Dec. 6, 2011, now allowed, and claims the benefit of priority under 35 U.S.C. §119 from Japanese Application No. 2010-276645, filed Dec. 13, 2010. The entire contents of each of which are incorporated herein by reference.

BACKGROUND

The present disclosure relates to an image processing apparatus and an image processing method that is preferably applied to an apparatus, such as an imaging apparatus that captures a still image and/or a moving image, a mobile telephone terminal, or an electronic information terminal, having an image display function. More particularly, the present disclosure relates to a technology applied to display of an icon on a screen.

Imaging apparatuses including digital still cameras in related art display various icon images indicating the operation modes or the operation statuses of the imaging apparatuses in display units that display images captured or played back by the imaging apparatuses. For example, the remaining amount of battery, the photographing size, and/or the photographing mode are displayed as the icon images.

It is necessary for a user using such an apparatus in which icon images are displayed to memorize the meaning of each icon image in advance. The user who has memorized the meaning of each icon image can immediately determine the current state of the apparatus from the displayed icon image. The meaning of each icon image is normally described in an instruction manual for the apparatus.

Japanese Unexamined Patent Application Publication No. 2006-323578 discloses a technology to superimpose the name of each icon image on the icon image to display the name of the icon image in a translucent state if the subsequent instruction is not input by an operator in a certain time period in the display of the icon image.

SUMMARY

The display of the name of each icon image at a portion where the icon image is displayed if no operation is performed for a certain time period, as in the technology disclosed in Japanese Unexamined Patent Application Publication No. 2006-323578, allows the user to know what the displayed icon image means, that is, the minimum function of the icon image from the displayed name of the icon image.

However, the characters indicating the name of each icon image are constantly displayed on the icon image in the display unit of the imaging apparatus each time no operation is performed for a certain time period. This display mode is very troublesome for the user who concentrates on the photographing with the imaging apparatus.

In particular, the increase in the number of functions of the imaging apparatus in recent years causes the number of kinds of icon images displayed in the display unit to be increased and it is not desirable that the names of multiple icon images on one screen are constantly displayed. Accordingly, the user possibly uses the imaging apparatus in a mode in which the function of displaying the names of icon images is turned off even if the imaging apparatus has the name display function and the name display function is not possibly fully used.

Although various proposals have been made to improve the technology to indicate the meaning of each icon image displayed on a screen to the user, there is a problem in that the various proposals do not necessarily provide user-friendliness guides.

Although the display in the display unit of the imaging apparatus is exemplified in the above description, similar problems can occur in various devices provided with display units in which icon images are displayed.

It is desirable to appropriately provide a guide, such as the meaning of each icon image, in display of the icon image in a display unit.

According to an embodiment of the present disclosure, a normal mode display process is performed to display icon images of kinds corresponding to an operation status of the apparatus in a display unit. In addition, an icon description display process is performed to display an icon selection image for selecting an icon image that is being displayed in the display unit upon reception of an operation input to activate an icon description mode during the normal mode display process in the display unit and display a description image for an icon image selected upon reception of an operation input while the icon selection image is being displayed in the display unit.

With the above configuration, upon reception of an operation by the user to activate the icon description mode, an image in which an icon displayed on the screen at the operation is selected is displayed and a description image for the icon image identified in the selection is displayed. Accordingly, it is possible to easily display the description image for the icon image that is being displayed in response to the operation to activate the icon description mode.

According to the present disclosure, it is possible to easily display the description image for the icon image that is being displayed in response to a user's operation to activate the icon description mode, thus effectively facilitating the understanding of the user about the operation of the apparatus and improving the responsiveness of the apparatus.

BRIEF DESCRIPTION OF THE DRAWINGS

FIG. 4 is a table showing an example of data prepared for describing icon images according to the embodiment of the present disclosure;

FIG. 6 is a table showing exemplary data in an icon table according to the embodiment of the present disclosure;

DETAILED DESCRIPTION OF EMBODIMENTS

[1. Example of Shape of Imaging Apparatus According to an Embodiment]

An imaging apparatus according to an embodiment of the present disclosure will now be described.

An image processing apparatus is applied to the imaging apparatus that is a camera capturing a still image and/or a moving image in the present embodiment.

Figure 1A:
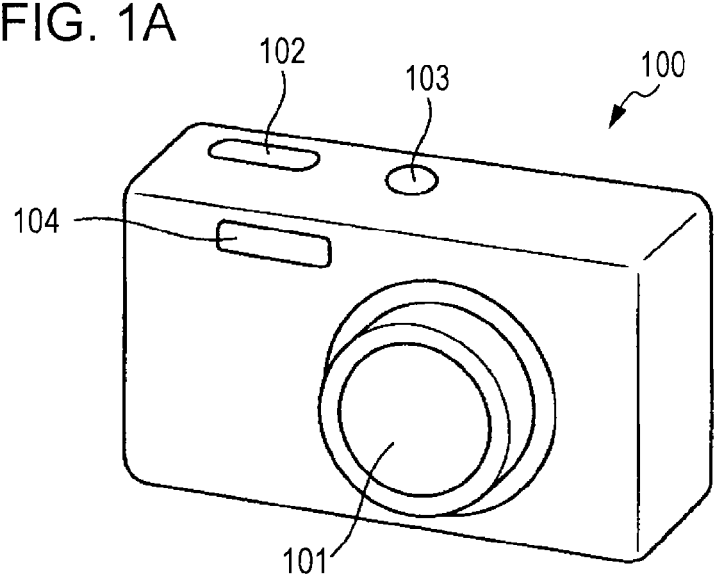
FIG. 1A is a front perspective view of an imaging apparatus according to an embodiment of the present disclosure and FIG. 1B is a rear perspective view thereof.
Figure 1B:
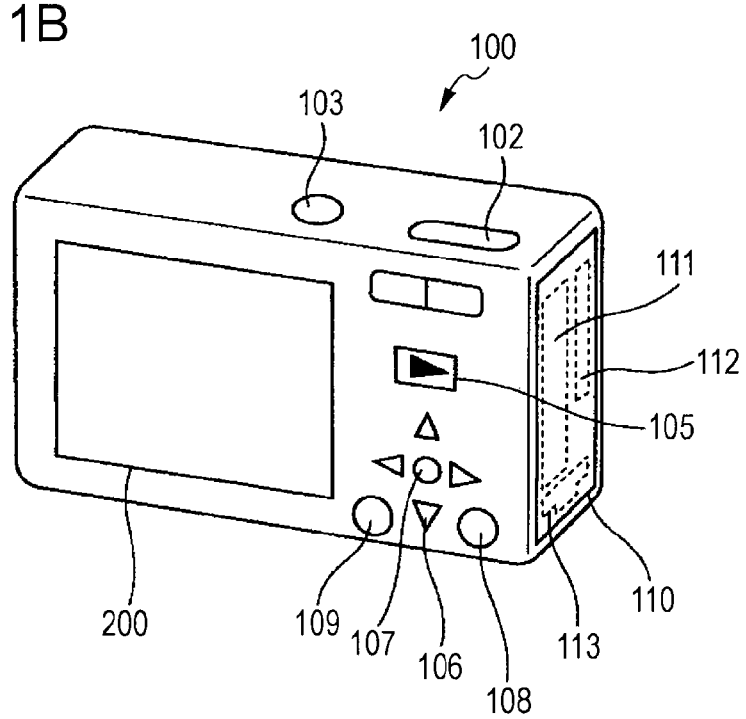

FIGS. 1A and 1B are perspective views showing the shape of the imaging apparatus of the present embodiment. FIG. 1A is a front view of the imaging apparatus and FIG. 1B is a rear view thereof.

Referring to FIG. 1A, an imaging apparatus 100 has an imaging lens 101 provided at the front face side of a casing composing the main body of the imaging apparatus 100. The imaging apparatus 100 also has a flash 104 provided on a side of the imaging lens 101. The imaging apparatus 100 further has a shutter button 102 and a power button 103 provided on the upper face thereof. The imaging apparatus 100 is started in response to an operation by a user with the power button 103 and a still image or a moving image is captured at a time when the user operates the shutter button 102 at the still-image or moving-image capturing timing.

Referring to FIG. 1B, a liquid crystal display panel 200 composing a display unit and various operation buttons composing an operation input receiving unit are provided at the rear face side of the casing composing the main body of the imaging apparatus 100. The operation buttons include a playback button 105, an up-down-left-right key 106, a determination key 107, a description mode button 108, and a menu button 109.

The playback button 105 is used by the user to instruct playback of a still image or a moving image that has been recorded. The up-down-left-right key 106 are used to instruct four directions: up, down, left, and right directions. The up-down-left-right key 106 are used by the user in combination with the determination key 107 to make an input concerning display of various guides or operations on the liquid crystal display panel 200.

The description mode button 108 is used by the user to set the operation mode of the imaging apparatus 100 to a description mode. The processing in the description mode will be described in detail below. The menu button 109 is used by the user to display menu screens for various operations on the liquid crystal display panel 200.

The operation input receiving unit may be an operation input receiving unit that receives an operation input from an external device (for example, a remote controller), instead of the operation input receiving unit provided with the buttons and the keys that directly receive such operations. Alternatively, the operation input receiving unit may be a touch panel, as in another example described below.

An openable cover 110 is provided on a side face of the casing composing the main body of the imaging apparatus 100. A battery storage part 111, a memory card slot 112, and a connection terminal 113 are provided inside the cover 110. The battery storage part 111 is where a battery that supplies power for driving the imaging apparatus 100 is housed. The memory card slot 112 includes a flash memory in which, for example, image data captured by the imaging apparatus 100 is recorded (stored). The connection terminal 113 connects the imaging apparatus 100 to an external device, such as a computer apparatus or a video device.

[2. Example of Internal Configuration of Imaging Apparatus According to the Embodiment]

Figure 2:
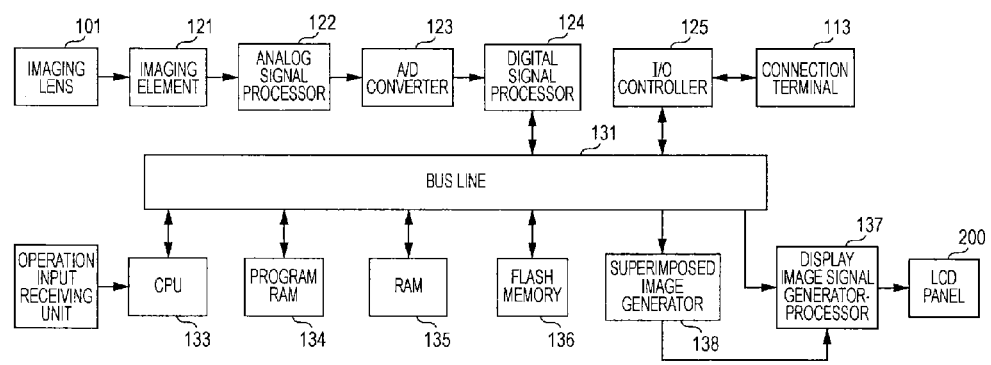
FIG. 2 is a block diagram showing an example of the internal configuration of the imaging apparatus according to the embodiment of the present disclosure.

FIG. 2 is a block diagram showing an example of the internal configuration of the imaging apparatus 100 according to the embodiment.

An imaging element 121, which is an imaging unit, is provided at a portion where light incident on the imaging lens 101 is focused and an imaging signal is generated in the imaging element 121. The imaging signal is supplied to an analog signal processor 122 where the imaging signal is subjected to a variety of analog signal processing and the signal is converted into a digital imaging signal in an analog-digital converter 123. The digital imaging signal is supplied to a digital signal processor 124 where the digital imaging signal is subjected to digital signal processing, thereby generating a digital image signal in a certain format.

The digital image signal generated in the digital signal processor 124 is recorded on a flash memory 136 under the control of a central control unit (central processing unit (CPU)) 133. The flash memory 136 may be a flash memory incorporated in the imaging apparatus 100 or may be a flash memory in a memory card loaded in the memory card slot 112 shown in FIG. 1.

The image signal processed in the digital signal processor 124 is supplied to a display image signal generator-processor 137 where the image signal is subjected to image signal processing for display in the liquid crystal display panel 200. As a result, the image captured by the imaging element 121, which is the imaging unit, is displayed on the liquid crystal display panel 200, which is the display unit. The image signals for display generated in the display image signal generator-processor 137 include various guide images, in addition to the captured image, and superimposition and selection of these image signals are also performed in the display image signal generator-processor 137. Image signals used for various guides, description, setting, etc. are generated in a superimposed image generator 138 and the generated image signals are supplied to the display image signal generator-processor 137. The images generated in the superimposed image generator 138 include, for example, various guide icon images to be displayed during the image capturing in a normal mode and guide display images in a description mode. These images will be described in detail below.

The image signal output from the digital signal processor 124 or the image signal recorded on the flash memory 136 is capable of being externally output from the connection terminal 113 through which an image signal, etc. are output under the control of an input-output controller 125.

The imaging apparatus 100 includes the central control unit 133 as a control system. Operation instructions from the various buttons: the shutter button 102, the power button 103, the playback button 105, the determination key 107, the description mode button 108, and/or the menu button 109 shown in FIG. 1 are supplied to the central control unit 133. In response to reception of operation inputs by the user with these buttons, the central control unit 133 supplies an instruction to each component through a bus line 131 to control an operation such as the image capturing.

A program random access memory (RAM) 134 storing operation programs for the imaging apparatus 100, etc. and a RAM 135 storing data that is being processed, etc. are connected to the bus line 131. The central control unit 133 executes the processing in accordance with the programs stored in the program RAM 134. A process of displaying an icon image in the normal mode and a display process in the description mode in which, for example, the displayed icon image is described, described below, are also performed in accordance with the programs stored in the program RAM 134 under the control of the central control unit 133.

Figure 8:
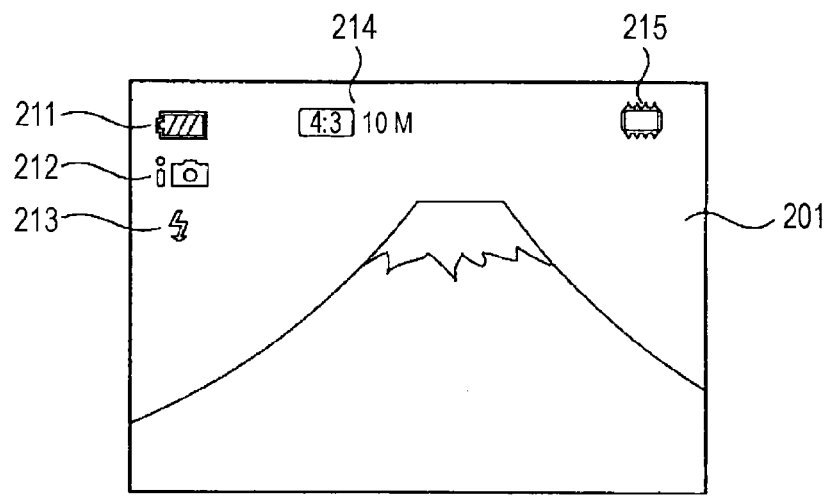
FIG. 8 shows an example of display in use of the imaging apparatus according to the embodiment of the present disclosure.

FIG. 8 shows an example of display on the liquid crystal display panel 200 in the normal mode in which the image capturing is performed.

An example of a monitor image 201 displayed on the liquid crystal display panel 200, which is the display unit, is shown in FIG. 8. An image captured by the imaging element 121, which is the imaging unit, is displayed on the substantially entire liquid crystal display panel 200 as the monitor image 201. Since the monitor image 201 is an image captured in real time, the monitor image 201 is normally a moving image. However, when the image capturing is performed in response to pressing of the shutter button 102 or the like, a still image of the captured image can be temporarily displayed.

Various guide icon images are superimposed on the monitor image 201. Specifically, a remaining-amount-of-battery icon image 211, a photographing mode icon image 212, a flash warning icon image 213, a recorded-image-size icon image 214, and a memory-card-loaded icon image 215 are displayed in the example in FIG. 8. Each of the icon images 211 to 215 is superimposed on the monitor image 201 at a predetermined position for the icon image, for example, along an upper side or a left side of the monitor image 201.

Although the display in the normal mode in an image capturing state in which the image capturing is shown in the example in FIG. 8, icon images for guiding playback are displayed also in another mode, for example, in the normal mode in a playback state in which the playback is performed.

In the imaging apparatus 100 of the present embodiment, the central control unit 133 performs a process of switching an image displayed on the liquid crystal display panel 200 to the display in the description mode in response to an operation input with the description mode button 108 in FIG. 1 in the display in the normal mode shown in FIG. 8.

[3. Process of Activating Description Mode According to the Embodiment]

Figure 3:
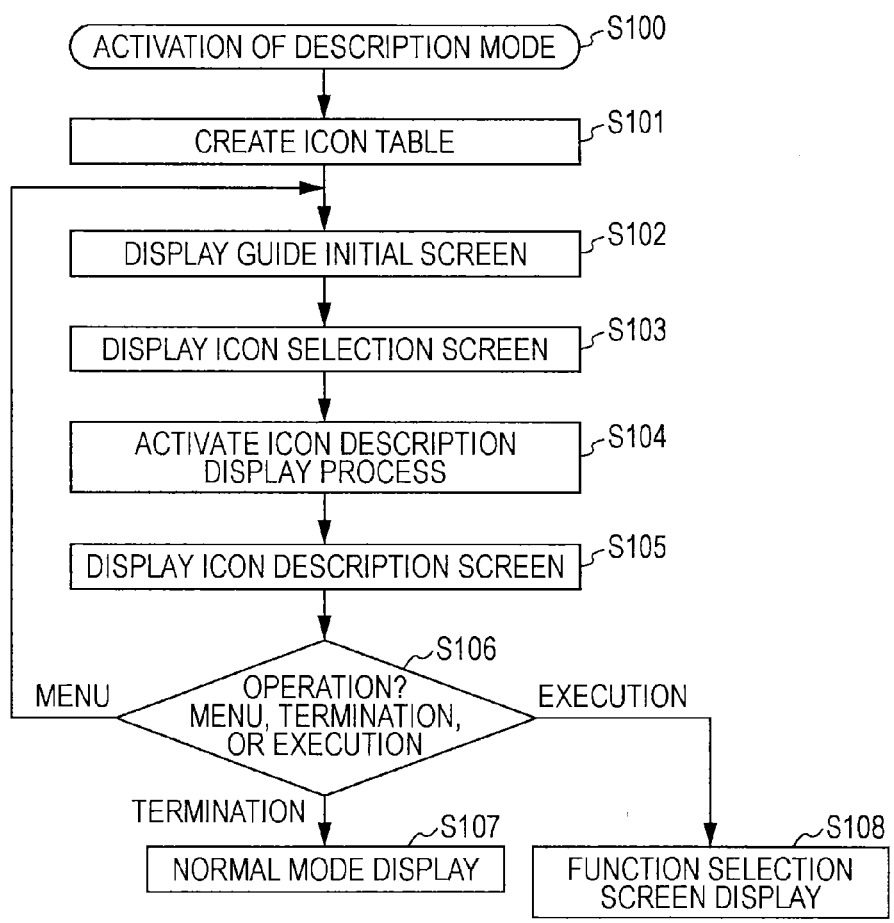
FIG. 3 is a flowchart showing an example of a process of activating a description mode according to the embodiment of the present disclosure.

FIG. 3 is a flowchart showing an example of a process of activating the description mode under the control of the central control unit 133 in response to an operation with the description mode button 108. FIG. 4 is a table showing an example of data prepared for describing icon images in the description mode. A screen indicates a screen displayed on the liquid crystal display panel 200, which is the display unit, in the following description.

Referring to FIG. 3, in Step S100, the central control unit 133 activates the description mode on the basis of determination of whether an operation input with the description mode button 108 is performed during the display in the normal mode. In Step S101, the central control unit 133 performs a process of creating an icon table. Data about icon images that are being displayed on the liquid crystal display panel 200 at the time when the description mode is activated, that is, at the time when an operation by the user with the description mode button 108 is performed is stored in the icon table. The icon table is stored in, for example, the RAM 135. The process of creating an icon table and the icon table will be described in detail below with reference to FIGS. 5 and 6.

After the process of creating an icon table is performed, in Step S102, the central control unit 133 performs a process of displaying a guide initial screen. In the process of displaying a guide initial screen, an initial screen that is prepared in advance for describing the operation of the imaging apparatus is displayed.

Figure 9:
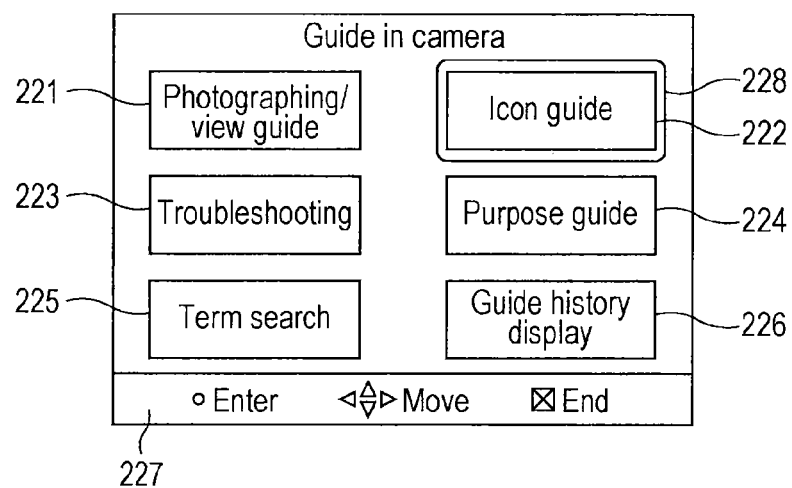
FIG. 9 shows an example of display in response to an operation with a description mode button according to the embodiment of the present disclosure.

FIG. 9 shows an example of how the guide initial screen is displayed. Various buttons used to select description items are displayed on the guide initial screen. Specifically, a Photographing/view guide button 221, an Icon guide button 222, a Troubleshooting button 223, a Purpose guide button 224, a Term search button 225, a Guide history display button 226 are displayed in the example in FIG. 9. In addition, operation guide display 227 for guiding selection of buttons is displayed along the lower side of the screen.

A state is shown in the example in FIG. 9, in which the Icon guide button 222 is selected and a selection frame 228 is displayed on the Icon guide button 222. An operation by the user with the determination key 107 in FIG. 1 in this state causes the selection of the Icon guide button 222 to be accepted. In order to move to a state in which another button is selected, the user performs an operation with the up-down-left-right key 106. When the description mode is activated from the normal mode, the selection frame 228 may be displayed on the Icon guide button 222 in the initial state, as shown in the example in FIG. 9, and the guide initial screen may be immediately moved to the icon guide in response to only an operation by the user with the determination key 107.

Referring back to FIG. 3, in Step S103, the central control unit 133 performs a process of displaying an icon selection screen in response to an operation by the user with the determination key 107 in the state in which the guide initial screen is displayed. In the icon selection screen display, all the icon images that have been displayed most recently are displayed on the screen on the basis of the data stored in the icon table. In response to an operation input to select one icon image from the displayed icon images with the up-down-left-right key 106 and the determination key 107, in Step S104, the central control unit 133 activates an icon description display process for the selected icon image. In Step S105, the central control unit 133 displays an icon description screen in response to the activation of the icon description display process.

After the icon description screen is displayed in Step S105, in Step S106, the central control unit 133 determines whether an operation input is performed and moves to another display state on the basis of the result of the determination. Specifically, if a menu button operation is performed, the central control unit 133 goes back to the process of displaying a guide initial screen in Step S102. If a termination operation is performed, in Step S107, the central control unit 133 goes back to the display in the normal mode. If an Execution button is displayed on the icon description screen and an operation to select the Execution button to accept the selection is performed, in Step S108, the central control unit 133 displays a function selection screen used by the user to select a function that is being described on the icon description screen.

Figure 10:
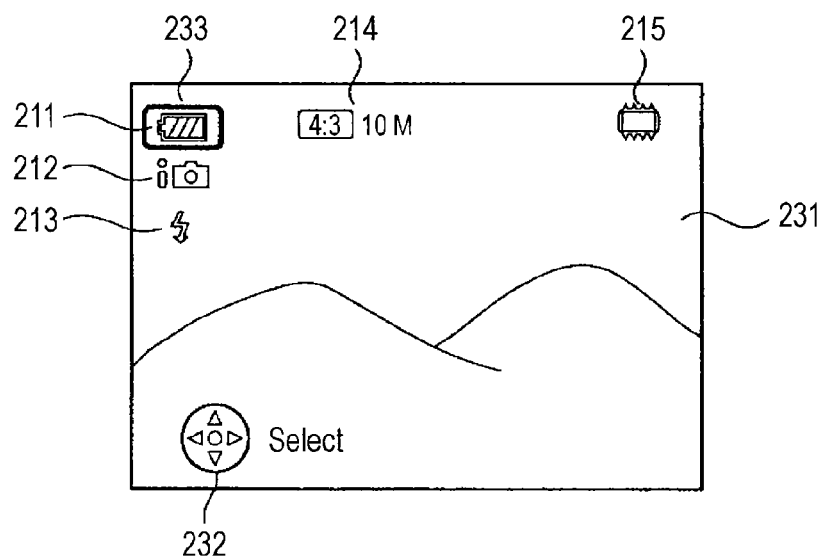
FIG. 10 shows an example of display when an icon is selected in an icon description mode according to the embodiment of the present disclosure.

FIG. 10 shows an example of how the icon selection screen is displayed in Step S103 in FIG. 3.

In the icon selection screen display, only the icon images displayed in the normal mode immediately before the description mode is activated in Step S100 are displayed in the same display state as in the normal mode on the basis of the data in the icon table. The same display state means that the icon images are displayed at the same positions and the same sizes as on the screen in the normal mode. Specifically, the remaining-amount-of-battery icon image 211, the photographing mode icon image 212, the flash warning icon image 213, the recorded-image-size icon image 214, and the memory-card-loaded icon image 215 are displayed at the same positions as in the example in FIG. 8. However, in the example of the icon selection screen in FIG. 10, a still image that is stored and prepared in the program RAM 134, etc. in advance is displayed as a background image 231. Displaying the still image as the background image 231 allows the user to easily understand that the display mode on the screen is different from the display in the normal mode.

The icon selection screen display in FIG. 10 includes selection frame display 233 indicating the selected icon and selection guide display 232 for guiding the selection operation. In the selection guide display 232, the fact that the icon selection can be performed by operations with the up-down-left-right key 106 and the determination key 107 is indicated by using, for example, a graphic. In response to an operation input with the up-down-left-right key 106, the position of the selection frame display 233 is sequentially moved to allow the user to select a desired icon image. The icon at the selected position is accepted in response to an operation with the determination key 107.

Figure 11:
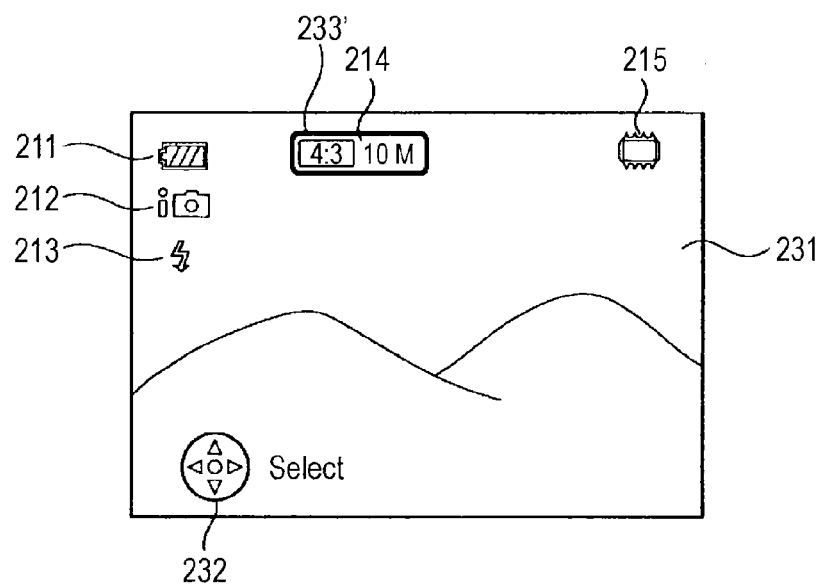
FIG. 11 shows an example of display when the icon selection position is moved in the icon description mode according to the embodiment of the present disclosure.

FIG. 11 shows an example of the position of selection frame display 233' that is moved in the icon selection screen display. In the example in FIG. 11, the selection frame display 233 in FIG. 10 is moved rightward with an operation with the up-down-left-right key 106 to select the recorded-image-size icon image 214. The selection frame can be displayed on the icon image desired by the user in the above manner.

Figure 12:
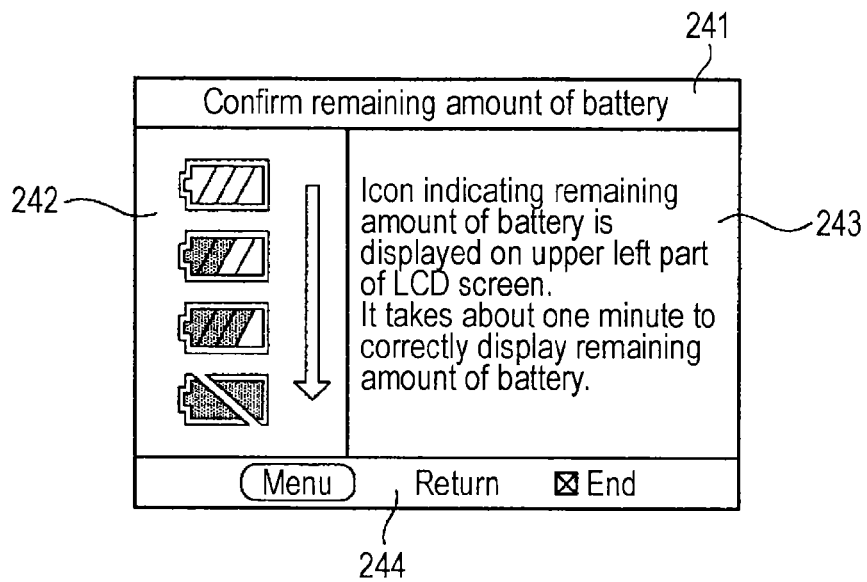
FIG. 12 shows an example of display of the description of a specific icon according to the embodiment of the present disclosure.

FIG. 12 shows an example of how the icon description screen is displayed in Step S105 in FIG. 3.

The example of the icon description screen in FIG. 12 results from selection of the remaining-amount-of-battery icon image 211. The icon description screen is based on the icon description data shown in FIG. 4. The icon description data describes the icon images prepared so as to be capable of being displayed on the liquid crystal display panel 200 of the imaging apparatus 100. Specifically, description identifier (ID) 11, title 12, first description sentence 13, second description sentence 14, third description sentence 15, guide content image 16, and corresponding image object ID 17 are prepared in association with the icon images, as shown in FIG. 4. However, the first to third description sentences 13 to 15 are stored if it is necessary to prepare the description on three screens and only one or two kinds of descriptions may be stored depending on the icon image. Image object IDs of all the icon images described in the first to third description sentences 13 to 15 are stored in the corresponding image object ID 17. For example, in the example in FIG. 4, all the icon images concerning the remaining amount of battery are shown as the corresponding image object ID 17 for description ID 001. Accordingly, the description (the title 12, the first description sentence 13, and the guide content image 16) of the description ID 001 is displayed regardless of which icon image concerning the remaining amount of battery is displayed.

The example of the icon description screen in FIG. 12 includes title display 241, example-of-icon-image-variation display 242, description sentence display 243, and operation guide display 244. The data in the title 12 in the icon description data in FIG. 4 is displayed in the title display 241. If multiple description sentences exist as in the example in FIG. 4, the pages of the description sentences are sequentially displayed one by one as the description sentence display 243. Images prepared as the guide content image 16 in the icon description data in FIG. 4 are displayed as the example-of-icon-image-variation display 242. In the example-of-icon-image-variation display 242 in the example in FIG. 12, images (a full-charge image, a first image when the remaining amount is decreased, a second image when the remaining amount is decreased, and no remaining amount image) indicating multiple levels of the remaining amount of battery are arranged. The example-of-icon-image-variation display 242 in FIG. 12 is an example and images for describing the respective icons, prepared as the guide content image 16 in FIG. 4, are displayed.

Figure 13:
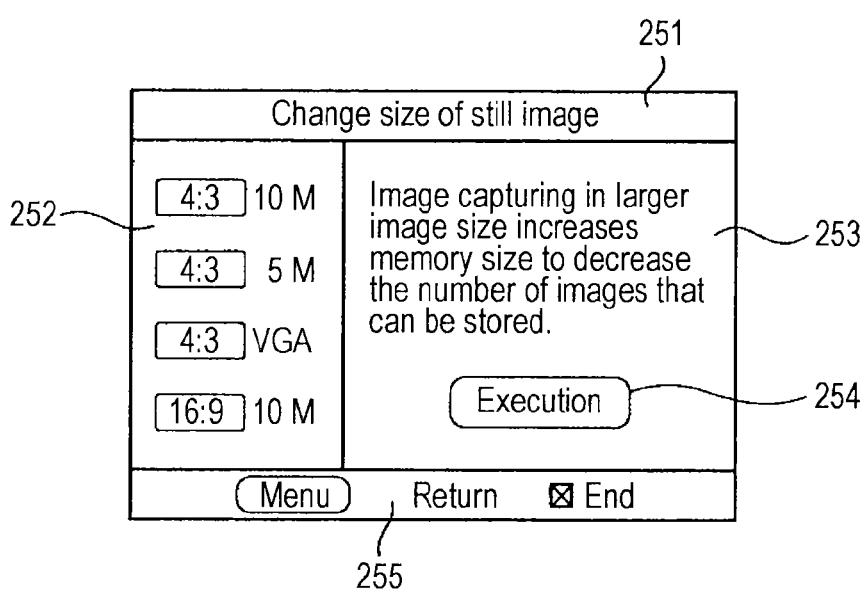
FIG. 13 shows an example of display of the description of another icon according to the embodiment of the present disclosure.

FIG. 13 shows another example of how the icon description screen is displayed. A description sentence for the icon image (corresponding to the recorded-image-size icon image 214 in FIG. 11) indicating the size of a still image that is captured is shown in the example in FIG. 13. The example of the icon description screen in FIG. 13 includes title display 251, example-of-icon-image-variation display 252, description sentence display 253, execution button display 254, and operation guide display 255. A list of multiple image sizes to be displayed is displayed in the example-of-icon-image-variation display 252. The execution button display 254 is used to determine an operation with the Execution button in Step S106 in FIG. 3 to goes to Step S108. The execution button display 254 is indicated as "Execution" in the example in FIG. 13.

Figure 14:
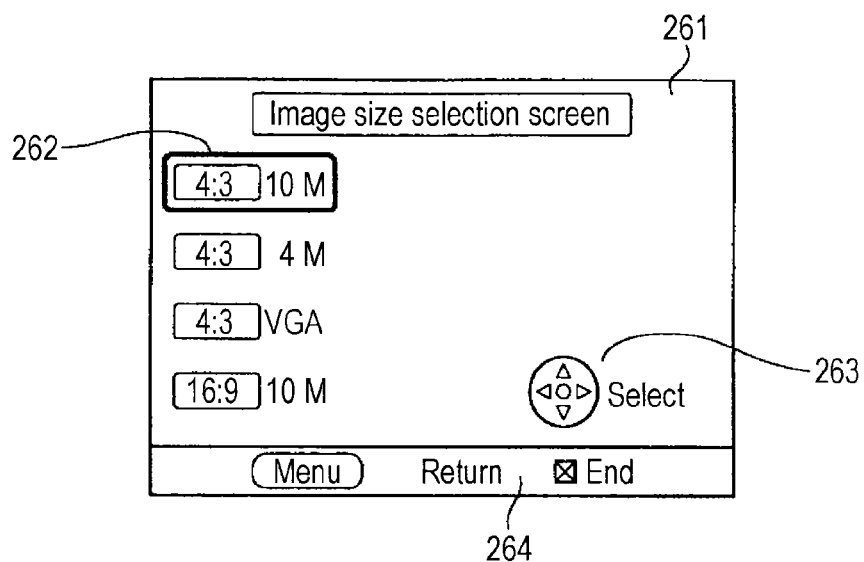
FIG. 14 shows an example of display when the icon description mode is switched to an execution state according to the embodiment of the present disclosure.

FIG. 14 shows an example of how the function selection screen in Step S108 in FIG. 3, used to select a function that is being described on the description screen, is displayed. The example in FIG. 14 shows image size selection screen display 261 when the execution button display 254 in FIG. 13 is pressed. Image size display 262 is selected from the list of image sizes that can be selected. The example in FIG. 14 also includes operation guide display 263 and operation guide display 264.

The size (the number of pixels and the aspect ratio of the image) of the captured image can be set (changed) in response to a user's operation based on the function selection screen display. Accordingly, after the description sentence of the icon image selected by the user is displayed, the described function can be set.

[4. Process of Creating Icon Table According to the Embodiment]

Figure 5:
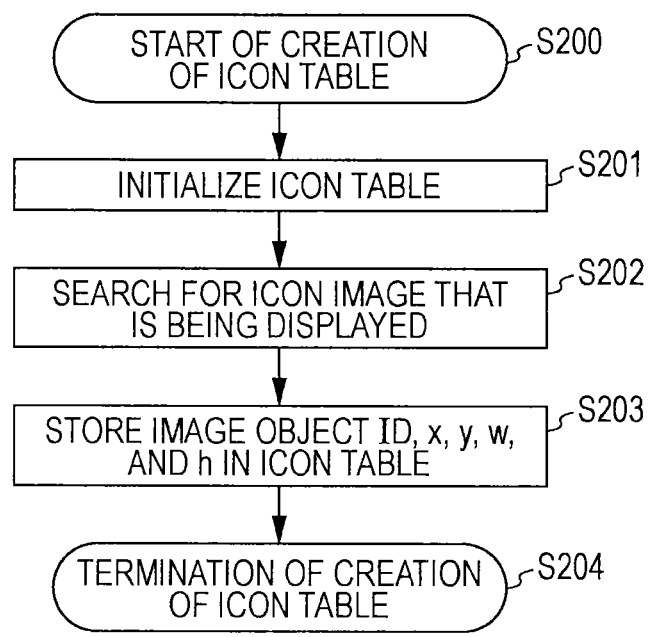
FIG. 5 is a flowchart showing an example of a process of creating an icon table according to the embodiment of the present disclosure.

FIG. 5 is a flowchart showing an example of the process of creating an icon table in Step S101 in FIG. 3. As described above, data about icon images that are being displayed in the normal mode at the time when the description mode is activated is stored in the icon table and the icon table is stored in, for example, the RAM 135.

Referring to FIG. 5, in Step S200, the creation of an icon table is started. In Step S201, the icon table is initialized. In Step S202, an icon image that is being displayed on the display screen is searched for when the description mode is activated. In Step S203, the type (ID) of the image object in the displayed icon image that is searched for, the display position of the icon image, and the display size of the icon image are stored in the icon table. In Step S204, the creation of the icon table is terminated after the data about all the icon images that are being displayed is stored.

FIG. 6 is a table showing exemplary data in the icon table.

Displayed object name 21, display ID 22, and image object name 23 of each icon are stored in the icon table, as shown in FIG. 6. The displayed object name 21, the display ID 22, and the image object name 23 are stored by referring to the data prepared to display the icon images. In addition, a horizontal-direction position (x) 24 on the screen, a vertical-direction position (y) 25 on the screen, a horizontal-direction display width (w) 26, and a vertical-direction display height (h) 27 are stored in the icon table. These positions, the width, and the height are the values of the positions, the width, and the height at which the icon image is actually displayed. The values of the positions, the width, and the height are shown, for example, in units of resolutions on the screen on which the icon images are displayed. In the example in FIG. 6, the xy coordinate of the displayed object at a resolution of 640×480 is represented in units of dots. If no data to be stored exists in each row or item, null data (represented as NULL in the table) indicating that no data to be stored exists is stored in the icon table.

The storage of the icon table in the above manner allows each icon to be displayed at the position and size stored in the icon table in the display of an icon selection image, as described above with reference to FIG. 3.

Figure 7:
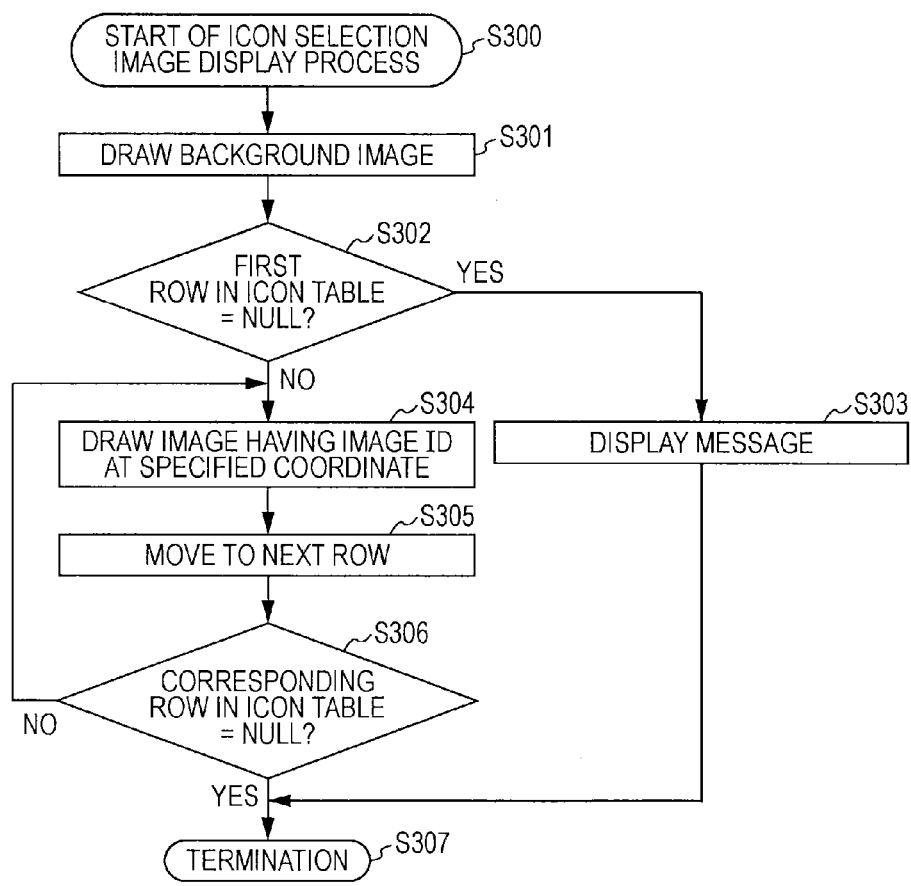
FIG. 7 is a flowchart showing an example of an icon display process in the icon description according to the embodiment of the present disclosure.

FIG. 7 is a flowchart showing an example of a process of displaying an icon selection image on the basis of the data in the icon table.

Referring to FIG. 7, in Step S300, the process of displaying an icon selection image is started. In Step S301, drawing of a background image is started. In Step S302, it is determined whether the first row of the icon table includes null data (no data). If the first row of the icon table includes null data indicating that no data is stored, in Step S303, a message indicating that no data is stored is displayed.

Figure 15:
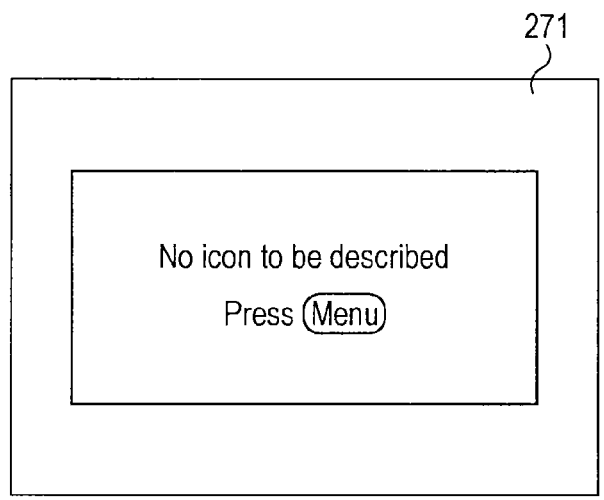
FIG. 15 shows an example of display when no data to be described exists according to the embodiment of the present disclosure.

FIG. 15 shows an example of display 271 in Step S303 in FIG. 7.

"No icon to be described. Press [Menu]" is displayed in the example in FIG. 15.

Referring back to FIG. 7, if it is determined in Step S302 that the first row of the icon table does not include null data, in Step S304, the icon image having the image ID at the first row of the icon table is drawn at a coordinate position and at a size specified in the icon table and the icon image is superimposed on the background image. In Step S305, movement to the next row in the icon table is performed. In Step S306, it is determined whether the row after the movement includes null data (no data). If the row after the movement includes null data, in Step S307, the process of displaying an icon selection image is terminated.

If it is determined in Step S306 that the row after the movement does not include null data, the process goes back to Step S304 to draw the icon image having the image ID at the row of the icon table at a coordinate position and at a size specified in the icon table and to superimpose the icon image on the background image. The process is repeated to display all the icon images displayed in the most recent normal mode at the same positions and the same sizes as in the normal mode, as shown in FIG. 10.

Accordingly, the association with the display in the most recent operation mode can be easily determined on the icon selection screen. As a result, it is possible for the user to easily select a desired icon and to intuitively select icons the meanings of which are not determined. In addition, upon selection and determination of an icon, the description of the icon is immediately displayed and, thus, the understanding of the operator about the imaging apparatus is facilitated to improve the responsiveness of the imaging apparatus. Furthermore, since a still image is used as the background image on the icon selection screen, it is easy for the user to identify the icons and to understand that the display is different from the display in the normal mode (that is, the icon selection screen is displayed), thus allowing the user to appropriately select an icon.

[5. Example of Display According to Another Embodiment (Example of Touch Panel)]

Operations with the up-down-left-right key 106 and the determination key 107 provided separately from the liquid crystal display panel 200 are performed in the selection on, for example, the icon selection screen in the embodiments described above. In contrast, when the imaging apparatus is provided with a touch panel that detects contact or proximity of an object, such as a finger, as the display panel such as the liquid crystal display panel, buttons corresponding to the up-down-left-right keys and the determination key may be displayed on the screen and similar operations may be performed in response to touch of the user on the buttons.

Figure 16:
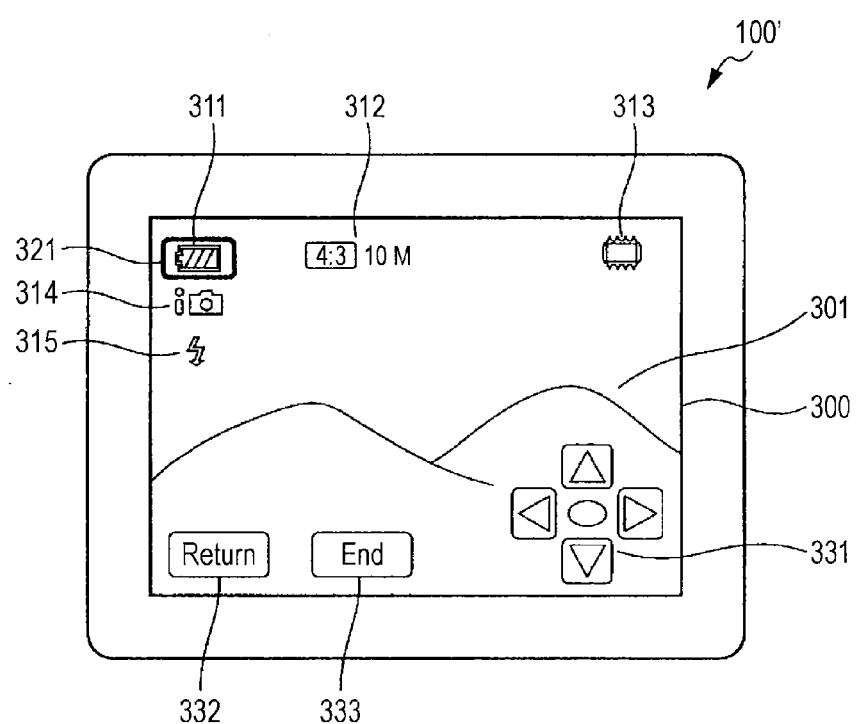
FIG. 16 shows an example of display when an icon is selected in the icon description mode on a touch panel according to another embodiment of the present disclosure.

FIG. 16 shows an example of an imaging apparatus 100' provided with such a touch panel.

The imaging apparatus 100' includes a display panel 300 with a touch panel, and the icon selection screen is displayed in the example in FIG. 16.

A background image 301, which is a still image prepared in advance, is displayed on the display panel 300 and the background image 301 has icon images 311, 312, 313, 314, and 315 superimposed thereon. In addition, a display frame 321 indicating an icon to be selected is displayed on the icon image 311 in the example in FIG. 16.

Furthermore, button display 331 used for instructing directions and performing the determination operation, a Return button 332, and an End button 333 are displayed on the display panel 300.

Touch of a portion in the button display 331 by the user with his/her finger, etc. in the above display state allows an icon image to be selected in a manner similar to the one in the imaging apparatus 100 shown in FIG. 1.

The example in FIG. 16 includes the button display 331 used for instructing directions and performing the determination operation. In contrast, a portion near the positions where the icon images 311, 312, 313, 314, and 315 are displayed on the display panel 300 may be directly touched by the user with his/her finger, etc. in the state in which the icon selection image is displayed to select the corresponding icon image. Directly touching an icon image in the state in which the icon selection image is displayed allows the icon image to be selected, thus more easily displaying the description of a desired icon.

[6. Modifications]

A still image prepared in advance is displayed as the background image 231, as in the example in FIG. 10, when the icon selection screen is displayed to allow the user to easily discriminate the display for selection from the display in the normal mode in the above embodiments. The background image prepared in advance is preferably an image that does not interfere with the display of the icon images that are superimposed. A scenic image is preferable to a monotonous image, for example, a monochromic image such as an entirely black or white image as the background image although the background image may have any content. Since a monochromic image, such as an entirely black image, displayed in the background is not preferred because the user can wrongly determine that the display of such an image indicates a trouble, any background image is displayed in the above embodiments. However, the background image may be omitted and no background may be displayed in which the entire background has the same color in an apparatus such as a business oriented imaging apparatus, the operator of which is limited to some extent. Alternatively, a mode in which any background image is superimposed or a mode in which no background is used may be selected by the user with an operation to set the background.

The background image may be a moving image prepared in advance, instead of a still image.

Alternatively, as in the display in the normal mode during the image capturing, a moving image or a still image generated from an image signal that is captured may be displayed as the background. In the display of a moving image or a still image generated from an image signal that is captured as the background, for example, the brightness of the background image may be made lower than that in the display in the normal mode to allow the display of the icon selection screen to be easily discriminated from the display in the normal mode. The chromaticity of the background image may be lowered, instead of the brightness thereof. Even when a still image prepared in advance is used as the background image, the brightness of the still image may be made lower than that in the display in the normal mode.

Furthermore, the display state may be selected from the various background images by the user with an operation to set the background.

Although the initial screen shown in FIG. 9 is displayed in response to an operation with the description mode button in the above embodiments, for example, the icon selection screen shown in FIG. 11 may be directly displayed in response to an operation with the description mode button.

Although the icon images are arranged on, for example, the icon selection screen in FIG. 10 in the same manner as on the display screen in the operation mode, another display mode, such as a list of icon images, may be adopted.

The icon images are arranged at the same positions and at the same sizes as in the normal mode, for example, in the example of display in FIG. 10. However, this display state is an example and another display state may be adopted as long as the display state can be determined to be the substantially same display state as in the normal mode. For example, an icon image displayed at a corner of the screen in the normal mode may be moved to a slightly inner position where the icon image is more visible for display. Alternatively, the display size of the icon image may be slightly increased, compared with the normal mode, to emphasize the icon image.

Although the present disclosure is applied to the imaging apparatus in the examples of the above embodiments, the present disclosure may be applied to the description of the icon images in other electronic devices having the function of the image processing apparatus.

For example, in the display of the icon images on the display panel of a mobile phone terminal apparatus, the process shown in FIG. 3 may be performed when the apparatus enters the description mode in response to an operation with a specific key to display the icon selection image and, then, display the description image in response to a subsequent operation.

Similar icon description images may be displayed in response to key operations when the icon images are displayed on the display panel of a tablet personal computer apparatus, a portable information terminal, a music playback terminal, an electronic game terminal, a digital book terminal, or the like. For example, the example of display shown in FIG. 16 is applicable to a terminal apparatus provided with a touch panel as the display panel.

The display unit may be provided separately from the main body of an electronic device that performs the processing described in the above embodiment. For example, the present disclosure is also applicable to a case in which a display apparatus (finder) that displays, for example, an image captured by the imaging apparatus is provided separately from the main body of the imaging apparatus.

An image processing method for displaying the icon description image described in the above embodiments may be performed by software (by using a program). The software may be incorporated in an electronic device having the existing image display processing function to add similar functions. When the software is incorporated in an electronic device provided with the image display processing function to perform similar processing, the electronic device itself does not necessarily include the display unit. For example, the present disclosure is applicable to a configuration in which icon images, etc. are displayed in a display unit connected to the electronic device.

The present disclosure contains subject matter related to that disclosed in Japanese Priority Patent Application JP 2010-276645 filed in the Japan Patent Office on Dec. 13, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an operation receiving unit;
a controller configured to perform:
 a normal mode display process of displaying icon images of kinds corresponding to an operation status of the apparatus on a display unit, and
 an icon description display process of
  displaying an icon selection image for selecting an icon image that is being displayed on the display unit upon reception of an operation input to activate an icon description mode by the operation receiving unit during the normal mode display process on the display unit, and
  displaying a description image for the icon image selected upon reception of an operation input by the operation receiving unit while the icon selection image is being displayed on the display unit; and
an imaging unit,
wherein an image captured by the imaging unit is displayed as a background of the display and the icon images are displayed with the captured image, in the normal mode display process, and
in the display of the icon selection image in the icon description mode, a background is displayed differently from that in the normal mode display process, while still including the captured image.

2. The image processing apparatus according to claim 1, wherein the icon selection image displayed on the display unit includes only the icon images displayed during the normal mode display process.

3. The image processing apparatus according to claim 2, wherein a display state in which the icon images are displayed in the icon selection image on a display screen of the display unit corresponds to a state in which the icon images are displayed on the display screen in the normal mode display process.

4. The image processing apparatus according to claim 3, wherein the display state corresponding to the state in which the icon images are displayed on the display screen includes a display state in which the icon images are displayed at the same positions as on the display screen.

5. The image processing apparatus according to claim 1, wherein the background is displayed differently from that in the normal mode display process by reducing brightness or chromaticity of the image captured by the imaging unit.

6. The image processing apparatus according to claim 1, wherein, upon reception of an operation input to select a specific portion displayed in the description image by the operation receiving unit, an image in which a function indicated by the icon image described in the description image is set is displayed.

7. The image processing apparatus according to claim 1, wherein, in a selection process within the icon selection image, candidates of the icon images to be selected are sequentially moved upon reception of an operation input by the operation receiving unit to select a desired icon image.

8. The image processing apparatus according to claim 1, wherein the image processing apparatus includes a touch panel that detects contact or proximity of an object on a display screen of the display unit as the operation receiving unit, and wherein, in a selection process in the icon selection image, a position where the contact or proximity of an object is detected on the touch panel or an icon image displayed near the position is selected.

9. An image processing method, implemented by an image processing apparatus, comprising: a normal mode display process, performed by a controller of the image processing apparatus, of displaying icon images of kinds corresponding to an operation status of the apparatus on a display unit; and an icon description display process, performed by the controller, of displaying an icon selection image for selecting an icon image that is being displayed on the display unit upon reception of an operation input to activate an icon description mode by an operation receiving unit of the image processing apparatus during the normal mode display process on the display unit, and displaying a description image for the icon image selected upon reception of an operation input by the operation receiving unit while the icon selection image is being displayed on the display unit, wherein an image captured by an imaging unit of the image processing apparatus is displayed as a background of the display and the icon images are displayed with the captured image, in the normal mode display process, and in the display of the icon selection image in the icon description mode, a background is displayed differently from that in the normal mode display process, while still including the captured image.

* * * * *